Figure 1:
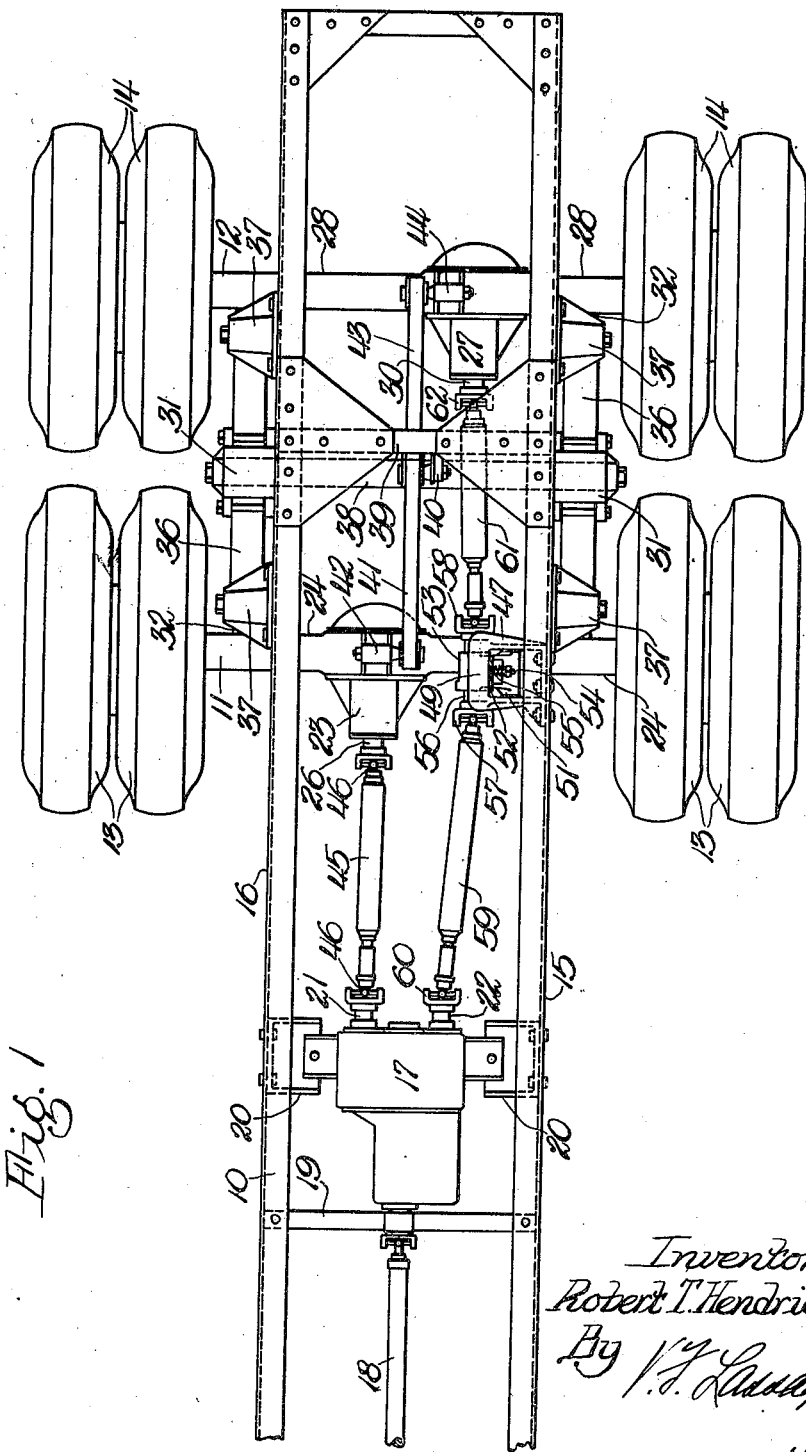

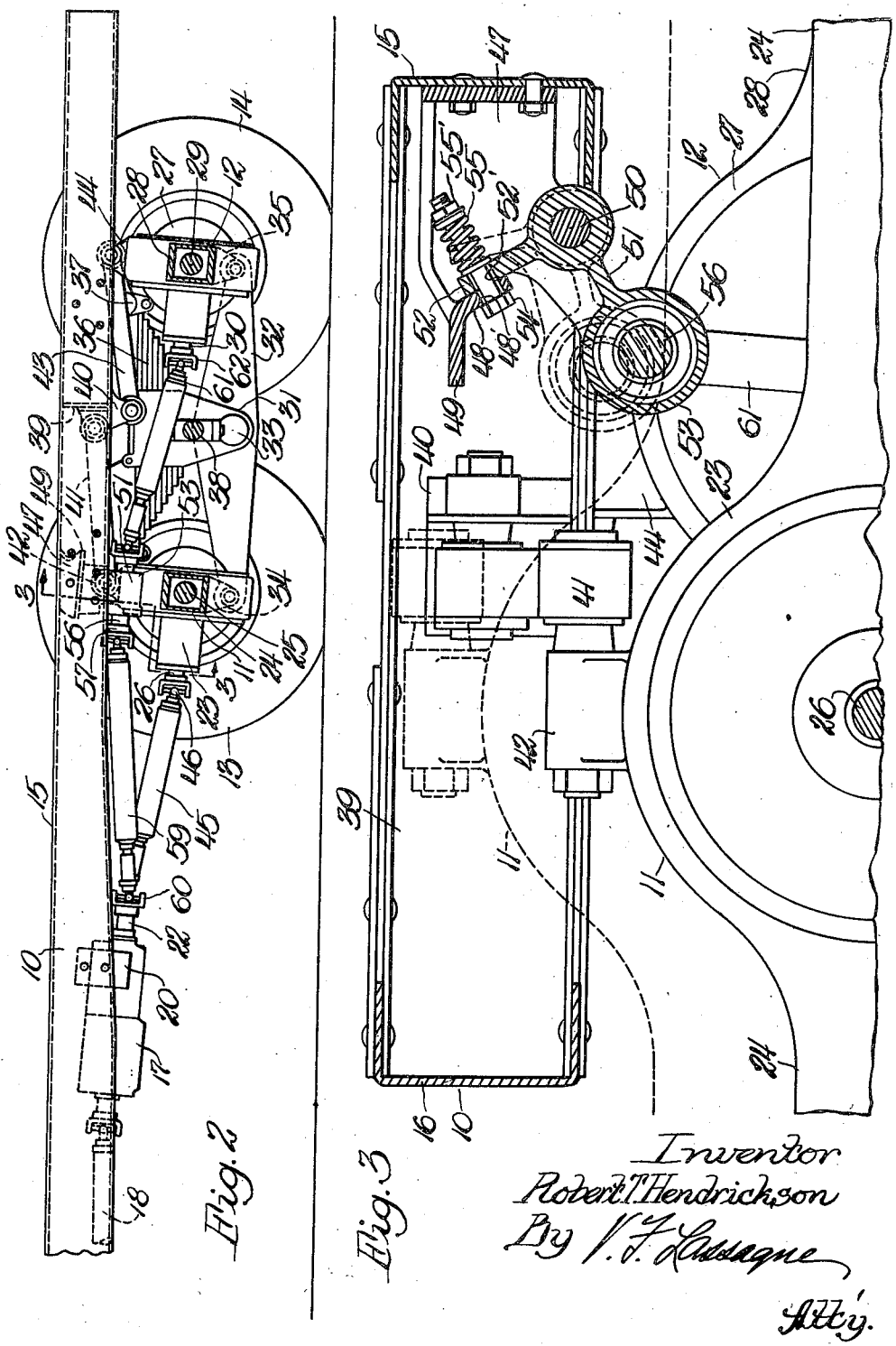

Patented Mar. 15, 1938

2,111,184

UNITED STATES PATENT OFFICE 2,111,184

MOTOR VEHICLE

Robert T. Hendrickson, Chicago, Ill.

Application June 29, 1936, Serial No. 87,877

11 Claims. (Cl. 180—22)

This invention relates to motor vehicles of the dual rear axle type, and more particularly to an improved mounting for the drive shaft which extends rearwardly to the second rear axle drive unit.

Because of the movement of the rear axle units independently of each other in a vertical direction under various ground and load conditions, it has been found desirable to drive each rear axle unit separately, though from the same transmission. The transmission is of the power dividing type and is driven from the engine by the propeller shaft and contains a third differential from which extend two flexible drive shafts, one for each rear axle unit. The drive shaft to the rear drive axle is of necessity longer than the drive shaft to the forward drive axle and must be mounted intermediate its ends in a bearing support.

The bearing support then must be universally mounted, preferably above the forward axle housing, and must provide for universal connections intermediate the ends of the drive shaft to compensate for the movement of the forward axle housing in a vertical direction. However, the bearing support must also be mounted in such a position that will provide the straightest line of driving torque between the transmission and the rear drive axle. It is not practicable nor desirable to mount the bearing support high on the frame as the angularity of the universal connections in the drive shaft is increased with a resultant increase of torsional stresses and premature wear of the joints. Nor is it practicable or desirable to locate a bearing support low enough to eliminate extreme angularity of the universal joints, which may be employed in the construction of flexible drive shafts, as the next difficulty encountered is interference between the bearing support and the forward drive axle housing with resultant damage to both parts.

Therefore, it is an important object of this invention to provide a bearing support capable of substantially eliminating both of the above mentioned difficulties, and many others, by movably mounting the bearing support on the frame.

Another object is to provide a bearing support that is held in a position of straightest line driving torque possible under normal operating conditions, yet resiliently movable upwardly without substantially increasing the angularity of the driving shaft connections.

Still another object is to provide an improved driving means and flexible or universally jointed drive shaft mounting that cooperate with the free mounting of the rear axle units with respect to the vehicle frame.

The above and other objects will be apparent from the following description and drawings of a vehicle embodying the new and improved bearing support.

In the drawings:

Figure 1 is a top plan view of a vehicle frame shown rearwardly from and including a transmission and the rear axle units and wheels and the flexible drive shafts therefor with the new and improved bearing support;

Figure 2 is a side view of the same with the left hand wheels and spring removed showing the vertical angularity necessary in the drive shafts; and, Figure 3 is a transverse sectional view taken on the line 3—3 of Figure 2, looking in the indicated direction, the dotted lines in the figure showing a position of vertical movement of the forward axle housing and compensation therefor by the new and improved bearing support.

In the particular embodiment of the invention disclosed herein, a truck of the dual rear wheel axle type is shown. The rear axle units are interconnected and support the vehicle frame by a preferable construction, but it will, of course, be understood that other connecting and supporting means may be employed to the advantage of the preferred form of the invention.

It will be understood that only that portion of the vehicle necessary to disclose the invention is shown, said vehicle comprising generally a frame 10, rear axle drive units 11 and 12, and wheels 13 on the forward unit and wheels 14 on the rearward unit.

The frame 10 includes left and right side rails 15 and 16 and carries forwardly of the drive axle units a transmission 17. The transmission 17 may be of the power dividing type and contains differential gearing (not shown) and is driven from the engine (not shown) by a propeller shaft 18. A cross member 19 between the side rails 15 and 16 serves to support the forward end of the transmission 17 in the frame. The transmission at its rear end is bolted to and further supported in the frame by the brackets 20. Differentially driven and extending rearwardly from the transmission 17 are two shafts 21 and 22.

The drive axle units are similar in construction, the forward unit comprising the differential housing 23 and the integral axle housings 24 for mounting the wheels 13. Differential gearing (not shown) contained in the housing 23 drives the drive axles 24, which drive the wheels 13 on either side of the frame 10. A shaft 26 extends forwardly from the differential housing 23 of the forward unit 11. The shaft 26 drives the differential gearing (not shown) and the drive axles 25. It will be noted that the center line of the differential housing 23 is to the right (facing forwardly from the rear of the vehicle) of the center line of the frame 10 and that the shaft 26 is substantially in line with the transmission shaft 21.

The rear drive axle unit 12 comprises the differential housing 27 and the integral axle housings 28 for mounting the wheels 14. Differential gearing (not shown) contained in the housing 27 drives the drive axles 29, which drive the wheels 14 on either side of the frame 10. A shaft 30 for driving the differential gearing (not shown) and the drive axles 29 extends forwardly from the housing 27. It will also be noted that the center line of the differential housing 27 is to the left of the center line of the frame 10, and the shaft 30 is parallel to the shaft 26 in the differential housing 23 of the forward unit 11.

Centrally between the two units 11 and 12 is a supporting structure comprising means for supporting the frame 10, said means consisting of two side brackets 31 mounted on the side rails 15 and 16. Further means in the form of two beams 32, one on either side of the frame 10, are pivoted intermediate their ends to the respective side brackets 31, as at 33, and are each pivoted at their opposite and corresponding ends to the two axle units 11 and 12 to bracket extensions 34 and 35 on the units located below the transverse center lines of the drive axles 25 and 29. These beams 32 serve to maintain the proper spacing of the two drive units 11 and 12 at all times.

The side brackets 31 are further secured at either side to leaf springs 36. The leaf springs 36 are mounted in brackets 37 on the side rails 15 and 16 of the frame 10 at points substantially above the center lines of the drive axles 25 and 29. A transverse tie-rod 38, pivotally connected to the side brackets 31, adds to the proper spacing of the supporting structure and allows for flexibility without contortion.

Extending transversely across the frame 10, substantially above the tie-rod 38 and rigidly secured to the side rails 15 and 16, is a cross member 39. The cross member 39 carries a bracket 40, which has pivotally connected to the forward portion thereof a torque or radius rod 41. This torque rod 41 extends forwardly and is pivotally connected to a bracket 42 integral with the differential housing 23. Pivotally connected to the lower portion of the bracket 39 and extending rearwardly therefrom is a second torque or radius rod 43 similar to the torque rod 41, which is pivotally connected to a bracket 44 on the differential housing 27. These torque rods serve to prevent tipping of the drive axle units 11 and 12 in either direction.

The above described supporting structure provides for a desirable and practicable support between the wheels 13 and 14 and the frame 10, allowing for movement of the drive axle units 11 and 12 upwardly and downwardly about the pivots 33 relative to each other, yet maintaining perfect and proper spacing thereof under all conditions.

As previously described, the shaft 26 extending forwardly from the differential housing 23 on the forward axle unit 11 is substantially in line with the transmission shaft 21 and is connected thereto by a telescopic, flexible drive shaft 45, which in the preferred construction disclosed is connected thereto by universal joints 46. Thus, a flexible drive is established between the transmission 17 and the forward axle unit 11.

Because of the movement in a vertical direction of the axle units 11 and 12, a means must be provided to carry a drive shaft from the transmission 17 to the rear axle unit 12. The means includes a bracket 47 secured to the left hand side rail 15 of the frame 10, substantially over the transverse center line of the forward drive axle unit 11 and spaced vertically thereabove.

This bracket is formed with a flange for attaching to the side rail 15, and has extending inwardly toward the center line of the vehicle frame a pair of spaced walls, integral with the attaching flange and being joined at their inner ends by an integral inclined stop portion or member 48 provided with a central opening 48'. This stop member 48 is parallel to the side rail 15 and at its upper edge has formed integrally therewith an inwardly extending flange portion 49, the purposes of all of which will be later described.

As previously described, the bracket 47 is open between the side walls and between the attaching flange and the stop member 48, and carries between the side walls on a pivot shaft 50 a bearing support 51.

The bearing support 51 is formed with an integral upwardly extending portion 52 which extends into the opening in the bracket 47, and a cylindrical portion 53, which extends downwardly and inwardly from the pivot shaft 50 toward the longitudinal center line of the vehicle frame 10.

The upwardly extending portion 52 is adapted to abut the stop member 48 on the bracket 47, and is formed with a central opening 52' in line with the opening 48' in the stop member 48. A bolt 54 extends through the openings 48' and 52' toward the side rail 15. A coil spring 55 and adjusting nut 55' complete a resilient means for holding the bearing support 51 downwardly against the stop member 48 for a purpose to appear later.

Journaled on bearings in the cylindrical portion 53 of the bearing support 51 is a short shaft 56 provided at its forward and rearward ends with universal joints 57 and 58. The axis of the shaft 56 is parallel to the longitudinal center line of the frame 10, as is the axis of the pivot shaft 50.

To establish a flexible driving connection or drive shaft between the transmission 17 and the rear axle unit 12, a telescopic shaft 59 is connected to the transmission shaft 22 by a universal joint 60 and to the short shaft 56 in the bearing support 51 by its forward universal joint 57.

As shown in Figure 1, the shaft 56 is substantially in line with the shaft 30 extending forwardly from the differential housing 27 on the rear axle unit 12. A telescopic shaft 61 is connected to the short shaft 56 at its rear universal joint 58 and to the differential shaft 30 by a universal joint 62. Thus, a flexible drive shaft is provided between the transmission 17 and the rear axle unit 12.

As previously stated, there is a large amount of vertical movement of the axle units 11 and 12 relative to each other and to the vehicle frame 10, and it is desirable not to limit the upward movement of the forward unit 11.

When the forward unit 11 rises to an extreme position, it will abut the cylindrical portion 53 of the bearing support 51 and, as shown in dotted lines in Figure 3, will raise the support 51 about the pivot shaft 50 in the bracket 47 and against the pressure of the spring 55. And, when the axle unit 11 returns to its normal position, the spring 55 will return the bearing support to its normal position with the portion 52 abutting the stop member 48. The flange portion 49 on the bracket 47 is at times abutted by the cylindrical portion 53 of the bearing support 51, preventing the bearing support from carrying over too high in the case of a violent lift of the unit 11. Such a position as might result therefrom would increase the angularity of the universal joints 57 and 58 to a point where damage would result. The spring 55 is sufficiently strong to hold the bearing support 51 in normal position against vibrational movement or whip that may develop in the shafting.

The position of the forward axle unit 11, as indicated in dotted lines in Figure 3, is a position where the unit has risen evenly on both sides. However, should the unit rise on one side only, near the rail 15, the bearing support 51 would function in the same manner.

It will be apparent from the above that a flexible means has been provided for carrying drive shafts from the transmission to the axle units, and that the means is both practicable and desirable from many standpoints, including that of maintaining the position of the drive shaft to the rear axle unit 12 in a spring pressed normal position of the straightest line drive over the forward axle unit 11, while providing for a resilient yielding of the drive shaft with a minimum of angularity of the universal joints.

It will also be apparent that only a preferred embodiment of the invention has been shown and described and many other forms of the same construction embodying the invention, such as various methods of providing flexible drive shafts may be employed without detracting from the benefits obtainable therefrom.

What is claimed is:

1. The combination with a vehicle frame, of a pair of axle housings, means for supporting the frame on said axle housings, a drive axle in the rearward housing, a transmission carried by the frame forwardly of the axle housings, a flexible drive shaft between the transmission and the drive axle, and means carried by the frame for vertical movement with respect thereto for supporting said drive shaft above the forward axle housing.

2. The combination with a vehicle frame, of a pair of relatively movable drive axle housings, drive axles in said housings, a propeller shaft, a power dividing transmission carried by the frame forwardly of the drive axles and driven by said propeller shaft, a flexible shaft between the transmission and the forward drive axle, a second flexible drive shaft between the transmission and rear drive axle substantially parallel to the first drive shaft and above the forward axle housing, and means carried by the vehicle frame for vertical movement with respect thereto for supporting the second drive shaft in vertical spaced relation above the forward axle housing, said means being normally held downwardly and resiliently yieldable upwardly by upward movement of the forward drive axle housing.

3. The combination with a vehicle frame, of a pair of relatively movable drive axle housings, drive axles in said housings, a transmission carried by the frame forwardly of the drive axles, a telescopic drive shaft between the transmission and the forward drive axle and connected by universal joints thereto, a telescopic driving connection between the transmission and rear drive axle connected by universal joints thereto and having universal joints intermediate its ends, said driving connection being substantially parallel to the drive shaft and above the forward axle housing, and means carried by the vehicle frame for vertical movement with respect thereto for supporting the driving connection intermediate its ends in vertical spaced relation above the forward axle housing, said means being normally held downwardly and resiliently yieldable upwardly by upward movement of the forward drive axle housing.

4. The combination with a vehicle frame, of a pair of drive axle housings, drive axles in said housings, two side beams pivotally connected at their ends to corresponding axle housings, means for pivotally supporting the frame on said beams intermediate their ends for permitting upward and downward movement of the axle housings relative to each other, a transmission carried by the frame forwardly of the axle housings, a flexible drive shaft between the transmission and the forward drive axle, means carried by the frame for vertical movement with respect thereto, and a second flexible drive shaft between the transmission and the rear drive axle, said second drive shaft being journaled in said movable means above the forward axle housing, said means and the journaled portion of said second drive shaft being movable upwardly by upward movement of the forward axle housing.

5. The combination with a vehicle frame, of a pair of drive axle housings, drive axles in said housings, a transmission carried by the frame forwardly of the drive axles and flexible drive shafts between the transmission and the respective drive axles, a bearing means carried by the frame for vertical movement with respect thereto for supporting the drive shaft to the rear axle, a stop member on the frame, and means cooperating with the stop member and the bearing means for holding the bearing means downwardly, said bearing means being movable upwardly by upward movement of the forward axle housing.

6. The combination with a vehicle frame, of a pair of drive axle housings, drive axles in said housings, a propeller shaft, a power dividing transmission carried by the frame forwardly of the drive axles and driven by said propeller shaft, flexible drive shafts driven by the transmission between the transmission and the respective drive axles, a bearing means carried by the frame for vertical movement with respect thereto for supporting the drive shaft to the rear axle, a stop member on the frame, and means cooperating with the stop member and the bearing means for holding the bearing means downwardly, said bearing means being movable upwardly by upward movement of the forward axle housing.

7. The combination with a vehicle frame, of a pair of relatively movable drive axle housings, drive axles in said housings, a transmission carried by the frame forwardly of the drive axles, a flexible drive shaft between the transmission and the forward drive axle, a second flexible shaft between the transmission and rear drive axle substantially parallel to the first drive shaft and above the forward axle housing, a bracket carried by the frame, a stop flange on the bracket, a bearing support pivotally carried by said bracket for movement in a substantially vertical plane for supporting the second drive shaft above the forward axle housing, and resilient means cooperating with the bracket and the bearing support, said resilient means normally holding the bearing support downwardly against the stop flange and permitting yielding upward movement of the same.

8. The combination with a vehicle frame, of a pair of drive axle housings, drive axles in said housings, two side brackets for supporting the frame, two side beams pivoted intermediate their ends to said respective side brackets and pivotally connected at their ends to corresponding axle housings for supporting the side brackets in a manner permitting upward and downward movement of the axle housings relative to each other, a transmission carried by the frame, a flexible drive shaft between the transmission and the forward drive axle, a bracket carried by the frame, a bearing support pivotally carried by said bracket for movement in a substantially vertical plane, and a flexible driving connection between the transmission and the rear drive axle including a stub shaft journaled in the bearing support, a drive shaft between the transmission and the stub shaft and a drive shaft between the stub shaft and the rear drive axle.

9. The combination with a vehicle frame, of a pair of drive axle housings, drive axles in said housings, two side brackets for supporting the frame, two side beams pivoted intermediate their ends to said respective side brackets and pivotally connected at their ends to corresponding axle housings for supporting the side brackets in a manner permitting upward and downward movement of the axle housings relative to each other, a propeller shaft, a power dividing transmission carried by the frame and driven by said propeller shaft, a drive shaft between the transmission and the forward drive axle and connected by universal joints thereto, a bracket carried by the frame, a bearing support pivotally carried by said bracket for movement in a substantially vertical plane, and a driving connection between the transmission and the rear drive axle including a stub shaft journaled in the bearing support, a drive shaft between the transmission and the stub shaft and connected by universal joints thereto and a drive shaft between the stub shaft and the rear drive axle and connected by universal joints thereto.

10. The combination with a vehicle frame, of a pair of drive axle housings, drive axles in said housings, two side beams pivotally connected at their ends to corresponding axle housings, means for pivotally supporting the frame on said beams intermediate their ends for permitting upward and downward movement of the axle housings relative to each other, a transmission carried by the frame, a flexible drive shaft between the transmission and the forward drive axle, a bracket carried by the frame, a bearing support pivotally carried by said bracket on a longitudinal axis, a stop flange on the bracket, resilient means cooperating with the bearing support and the bracket, and a flexible driving connection between the transmission and the rear drive axle including a stub shaft journaled in the bearing support parallel to the pivot axis, a drive shaft between the transmission and the stub shaft and a drive shaft between the stub shaft and the rear drive axle, whereby the aforesaid resilient means normally holds said flexible driving connection downwardly and permits yieldable upward movement thereof when the bearing support is contacted by upward movement of the forward axle housing.

11. The combination with a vehicle frame, of a pair of drive axle housings, drive axles in said housings, two side brackets for supporting the frame, two side beams pivoted intermediate their ends to said respective side brackets and pivotally connected at their ends to corresponding axle housings for supporting the side brackets in a manner permitting upward and downward movement of the axle housings relative to each other, a propeller shaft, a power dividing transmission carried by the frame and driven by said propeller shaft, a drive shaft between the transmission and the forward drive axle and connected by universal joints thereto, a bracket carried by the frame, a bearing support pivotally carried by said bracket on a longitudinal axis, a stop flange on the bracket, resilient means cooperating with the bearing support and the bracket, and a driving connection between the transmission and the rear drive axle including a stub shaft journaled in the bearing support parallel to the pivot axis, a drive shaft between the transmission and the stub shaft and connected by universal joints thereto and a drive shaft between the stub shaft and the rear drive axle and connected by universal joints thereto, whereby the aforesaid resilient means normally holds said driving connection downwardly and permits yieldable upward movement thereof when the bearing support is contacted by upward movement of the forward axle housing.

ROBERT T. HENDRICKSON.